United States Patent
Berry et al.

(10) Patent No.: US 7,755,563 B2
(45) Date of Patent: Jul. 13, 2010

(54) RADIO FREQUENCY IDENTIFICATION (RFID) PORTAL ANTENNA MOUNTING FRAME

(75) Inventors: Curtis L. Berry, Williamsport, MD (US); Mark Timothy Warren, Jr., Lewiston, MT (US)

(73) Assignee: Jamison Door Company, Hagerstown, MD (US)

( * ) Notice: Subject to any disclaimer, the term of this patent is extended or adjusted under 35 U.S.C. 154(b) by 554 days.

(21) Appl. No.: 11/741,663

(22) Filed: Apr. 27, 2007

(65) Prior Publication Data

US 2007/0252701 A1    Nov. 1, 2007

Related U.S. Application Data

(60) Provisional application No. 60/795,940, filed on Apr. 28, 2006.

(51) Int. Cl.
   *H01Q 1/12* (2006.01)
(52) U.S. Cl. ...................................... 343/878
(58) Field of Classification Search ................ 343/872, 343/874, 878, 880
   See application file for complete search history.

(56) References Cited

U.S. PATENT DOCUMENTS

| | | | | |
|---|---|---|---|---|
| 4,841,309 A | * | 6/1989 | Burr | 343/766 |
| 5,657,031 A | * | 8/1997 | Anderson et al. | 343/757 |
| 5,926,151 A | | 7/1999 | Hagiwara et al. | |
| 6,037,913 A | * | 3/2000 | Johnson | 343/882 |
| 6,342,870 B1 | * | 1/2002 | Mehrkens et al. | 343/891 |
| 6,825,766 B2 | | 11/2004 | Hewitt et al. | |
| 6,956,538 B2 | * | 10/2005 | Moore | 343/878 |
| 7,015,872 B1 | * | 3/2006 | Little | 343/890 |
| 7,036,734 B2 | * | 5/2006 | Baker | 235/451 |
| 2002/0105478 A1 | * | 8/2002 | Overton | 343/892 |
| 2005/0057427 A1 | * | 3/2005 | Wensink | 343/878 |

\* cited by examiner

*Primary Examiner*—Huedung Mancuso
(74) *Attorney, Agent, or Firm*—Frost Brown Todd LLC

(57) ABSTRACT

A radio frequency identification (RFID) portal easily installs and integrates any RFID hardware/software systems. The RFID portal may match the size of a traditional dock or be custom sized. The portal takes advantage of a variety of unique features including an antenna bracket that provides for three-dimensional vertical and horizontal movements and a hardware independent reader bracket. The antenna movement capabilities allow for excellent RFID signal coverage. A General Purpose Input/Output (GPIO) bridge enables rapid integration and functionality to other RFID inputs such as Motion Detectors/Photo Eyes, Uninterrupted Power Supply (UPS), Wireless Networking, floor loops, mass detectors, and output signals, such as to light stacks and RFID readers.

10 Claims, 13 Drawing Sheets

RADIO FREQUENCY IDENTIFICATION (RFID) PORTAL ANTENNA MOUNTING FRAME

CROSS REFERENCE TO RELATED APPLICATIONS

The present application claims the benefit of U.S. patent application Ser. No. 60/795,940 "Radio Frequency Identification (RFID) Portal Antenna Mounting Frame" to Berry et al., filed 28 Apr. 2006, the disclosure of which is hereby incorporated by reference in its entirety.

FIELD OF THE INVENTION

The present invention relates, in general, to radio frequency identification (RFID) systems, and more particularly to mounting structures for RFIU) system antennas and transceivers.

BACKGROUND OF THE INVENTION

One aspect of installing a radio frequency identification (RFID) system is antenna mounting and direction sensing. Typically RFID antennas are mounted on an open framework and are gimbaled to positions that provide the best reception. Relocating the antenna racket on the open framework and realigning the antenna is the generally known way to adjust the position of the antenna pattern. In addition, the open framework exposes the RFID antennas and associated equipment to the environment where they are more prone to being damaged.

It also generally known to enclose framework for RFID antennas and the associated equipment, as described in U.S. Pat. No. 6,825,766. However, the enclosure tends to limit the flexibility of the placement of the antennas to the detriment of needed reception for some applications. The antennas are mounted on structures in a manner similar to the mounting of car speakers and then covered with a protective cover, thus precluding adjustments in positioning.

Antennas also need to occasionally be removed or replaced and, in many cases, the value of the antenna is significant. Typically the antenna bracket is mounted to the support structure and then the antenna is mounted to the bracket. This usually involves several nuts and or bolts, holding the antenna in position, lining up holes and manipulating tools. In many cases this is inconvenient and time consuming and in some cases the antenna can be dropped or damaged because of the complexity of the installation.

Consequently, we recognized that the close confines of RFID installations within a facility tend to not benefit from installation flexibility that is generally known for other types of telecommunication systems, for instance U.S. Pat. No. 5,926,151, wherein pole-mounted external antennas may be mounted at a desired height and azimuth. We also recognize that antenna installation can be improved so that it can be done without tools or risking damage to the antennas.

Consequently, a significant need exists for a mounting structure for RFID antennas and associated equipment that is readily adapted to a range of applications and equipment variations.

BRIEF SUMMARY OF THE INVENTION

The invention overcomes the above-noted and other deficiencies of the prior art by providing a mounting structure for a radio frequency identification (RFID) system having at least one antenna and a transceiver controller unit and includes an enclosed mounting pole and a bracket that has a hand-tightened fastener that grips the pole at a selected height and orientation. The bracket has a surface sized to easily engage to a selected component of the RFID system and can be removed from the structure without tools. The structure protects the RFID equipment from environmental or accidental damage and provides an RF transparent view area for transmission and reception.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF THE INVENTION

Figure 1:
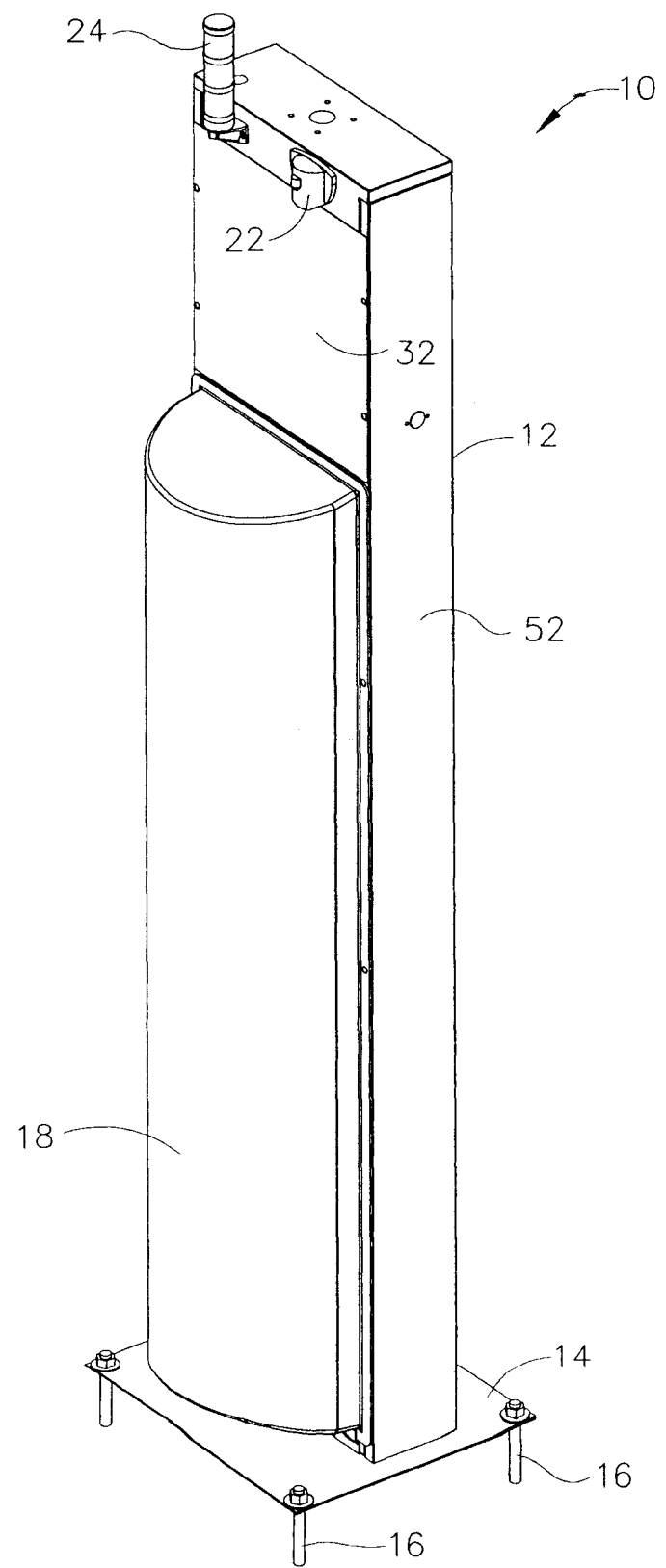
FIG. 1 is an isometric view of a radio frequency identification (RFID) reader station.
Figure 2:
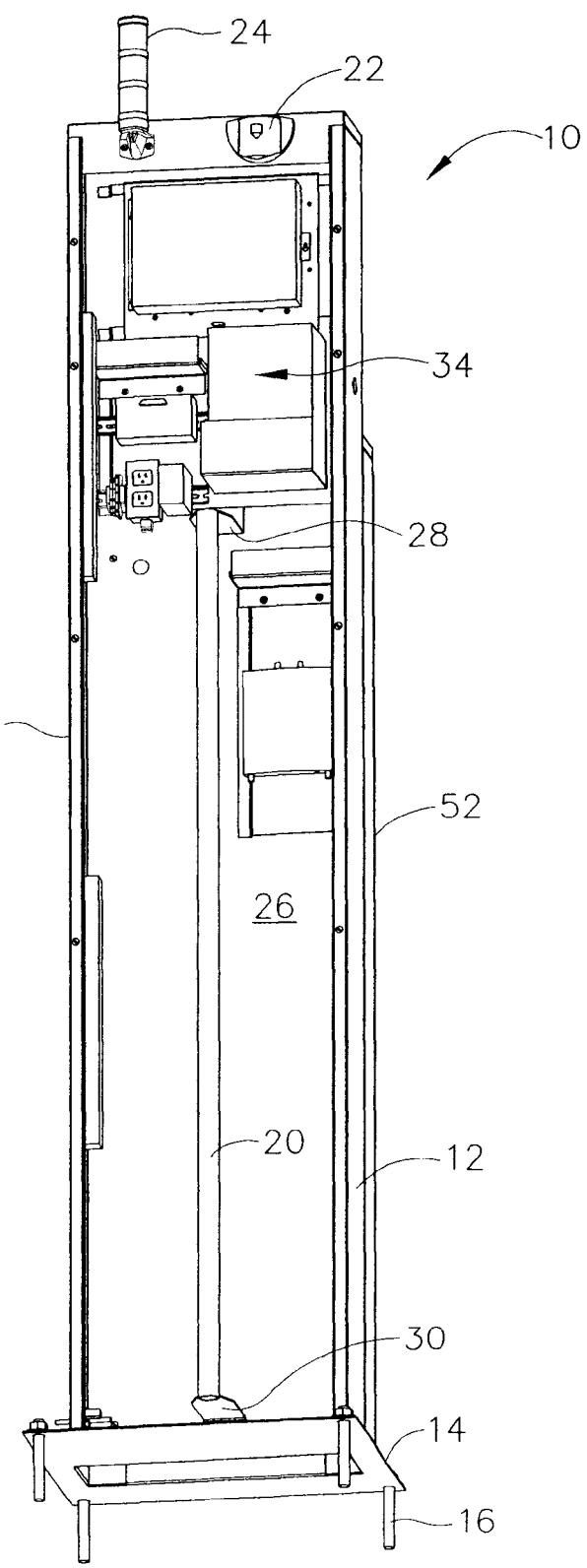
FIG. 2 is an isometric view of the RFID reader station of FIG. 1 with a radome and top cover removed.

Turning to the Figures, wherein like numerals denote like components throughout the several views, in FIGS. 1-2, a first version of a Radio Frequency Identification (RFID) reader station 10 comprises a stand-alone pedestal cabinet 12 atop a floor plate 14 having fasteners 16 intended for permanent installation into flooring or substrate (e.g., concrete) adjacent to a traffic pathway (e.g., a doorway). A longitudinally bisected elongate half-cylindrical radome 18 encloses a vertical mounting pole 20 (FIG. 2).

A motion detector 22 and a light stack 24 may be attached to the RFID reader station 10 for providing guidance to personnel such as forklift operators and/or to indicate operating status. Audible signals may be provided in addition to or as an alternative to visual signals. For example, a red light provided by the light stack 24 may indicate that one or more RFID tags cannot be successfully read, although the motion detector 22 indicates that an object presumed to included RFID tagged contents are within range of the RFID reader station 10, or that the sensed RFID tagged contents are read but not manifested as being cleared for entry past the RFID reader station 10. A yellow or white light by the light stack 24 may indicate that interrogation of the RFID tags is in process and to proceed toward, but not pass, the RFID reader station 10. A green light by the light stack 24 may indicate successful interrogation of the RFID tags, perhaps with wireless verification against a database or other remote tracking system.

It should be appreciated that a mobile base may be incorporated onto the RFID reader station 10 instead of fasteners 16. Wheels may be selected having a diameter, number, lateral offset, and composition appropriate for the intended installation (e.g., smoothness of surface and how much control is necessary for placement). In some instances, the wheels may be omni-directional (e.g., castoring) for expeditious rotation and movement. The ability to lock or to move the wheels up out of contact with the floor (e.g., pivot up or be raised through a slot in a base) may be incorporated to prevent inadvertent movement. In some applications, skids may suffice for limited movement.

In FIG. 2, the pedestal cabinet 12 has the radome 18 removed to expose the vertical mounting pole 20 spaced away from a back wall 26 of the cabinet 12 by top and bottom pole brackets 28, 30. In addition to the radome 18, a top panel 32 is removed to expose RFID electrical power and control circuitry 34 including a general purpose input and output (GPIO) plug panel adapted for quick installation of one of a plurality of commercially available RFII) reader systems, a power supply, an electrical outlet, terminal strips, etc.

It should be appreciated with the benefit of the present disclosure that a GPIO plug panel may include means of connecting custom cables intended for input and output devices (e.g., light stacks and motion detectors) to a single GPIO Interface Device using a reader specific cable. The reader specific cable may perform simple pin mapping from GPIO pins on the RFID reader to specific pins on the GPIO Interface Device. The interface may convert different signal voltage levels. Input from a manual switch, such as a light switch, may provide control input to the RFID reader in a hardened industrial environment.

Figure 3:
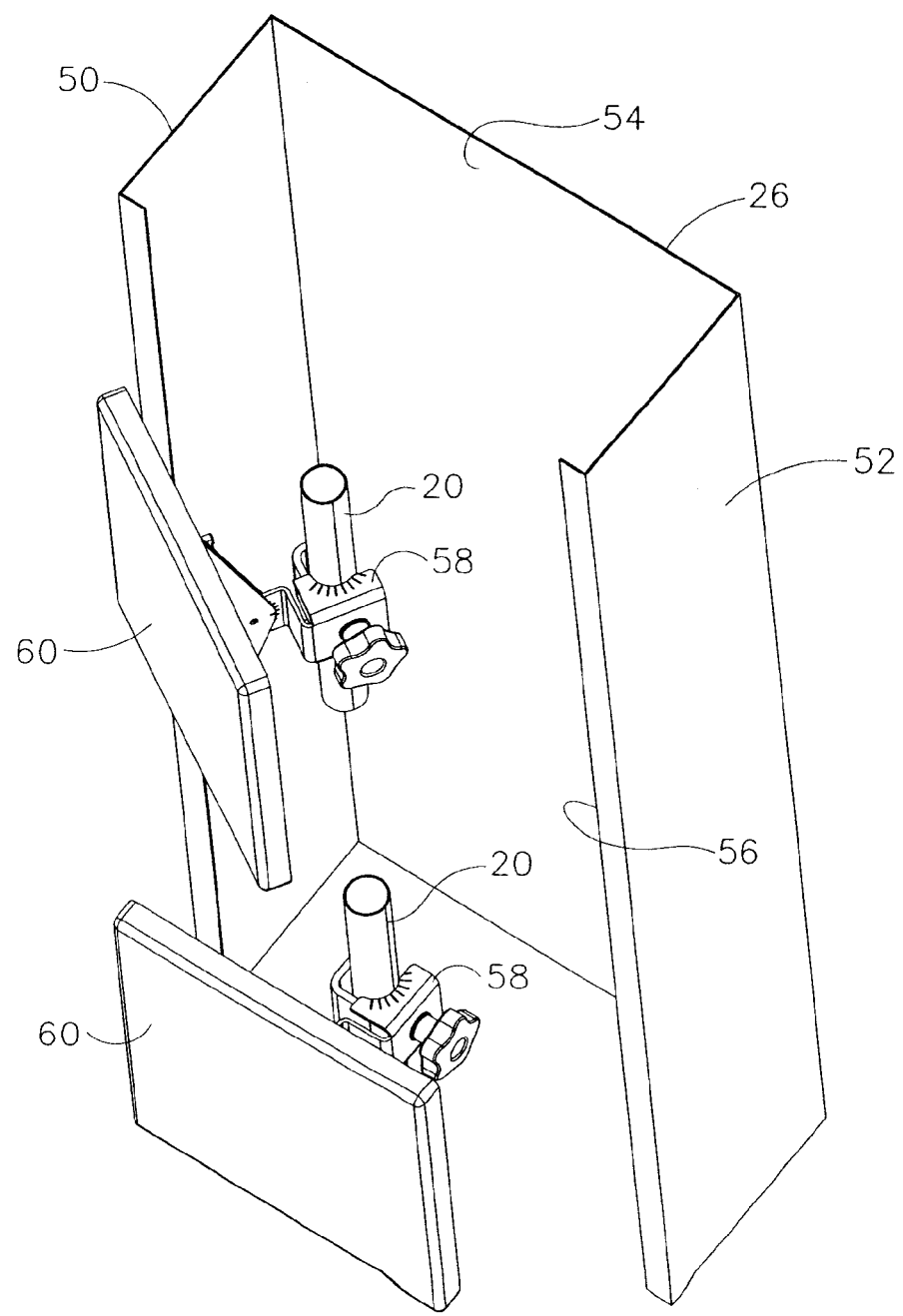
FIG. 3 is an isometric cutway view of a portion of the RFID reader station of FIG. 1 with antenna mounting brackets.

In FIG. 3, a vertical mid-portion of the pedestal cabinet 12 depicts shallow left and right side vertical panels 50, 52 extending from the back wall 26 to form an inwardly open channel 54. The vertical mounting pole 20 is approximately positioned at an opening 56 of the inwardly open channel 54 affording a wide adjustment and reception area of a plurality of antenna mounting brackets 58, each positioning an RFID antenna 60. Each bracket 58 advantageously includes a hand-adjusted pole clamp 62 that enables attachment at a desired radial angle and longitudinal position along an axis defined by the mounting pole 20.

Figure 4:
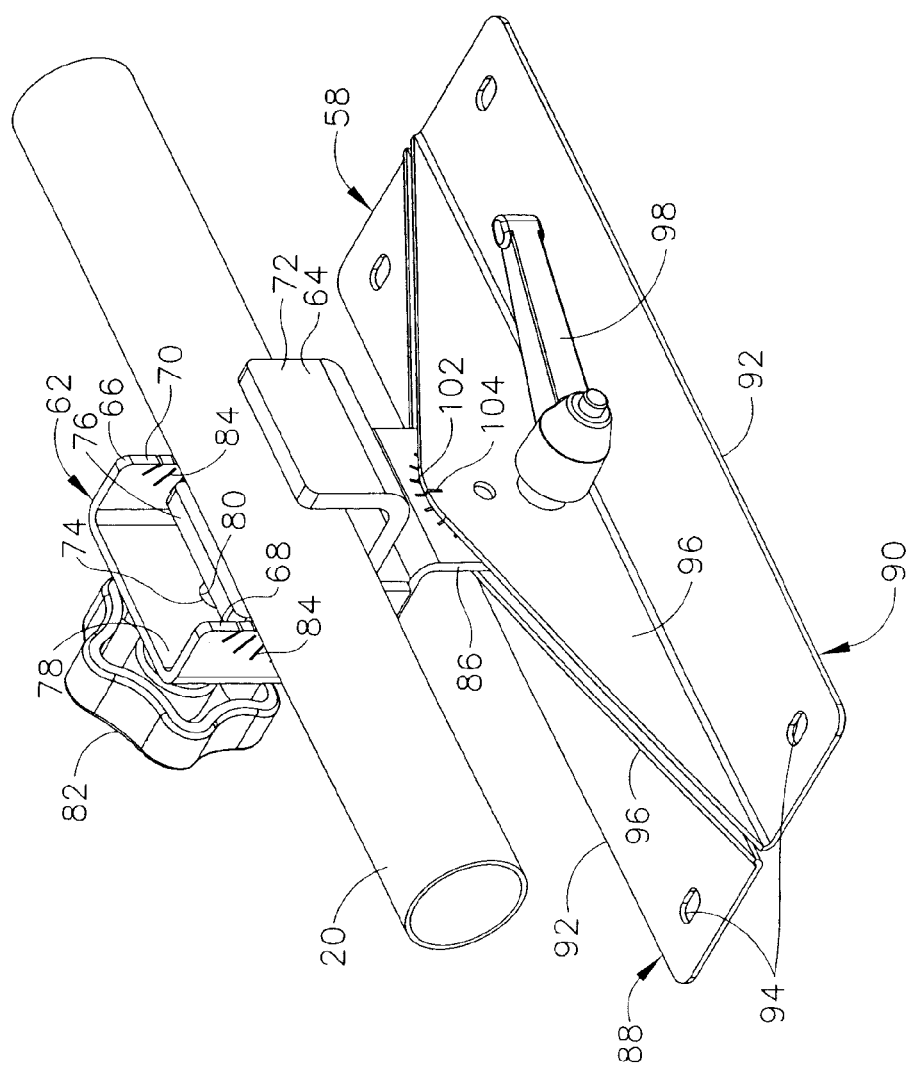
FIG. 4 is an isometric view of the antenna mounting bracket of FIG. 3 depicting a locking lever and engagement to a mounting pole.
Figure 5:
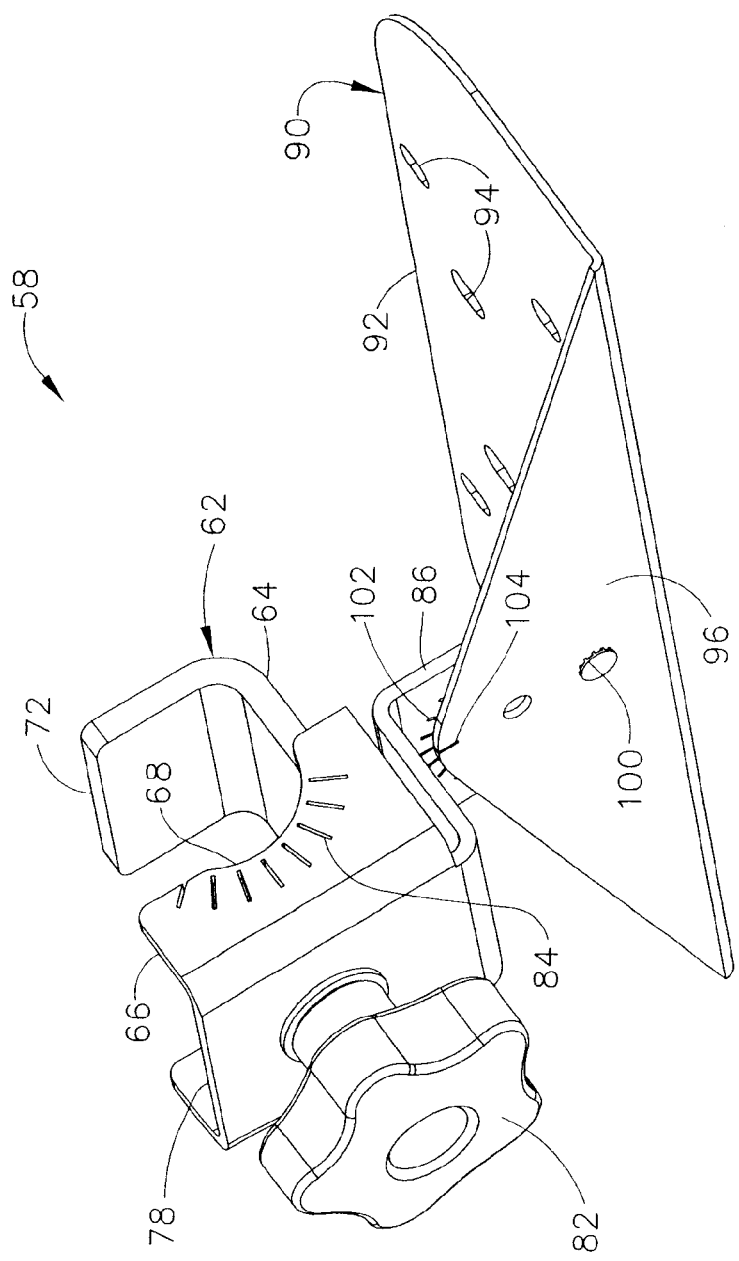
FIG. 5 is a back isometric view of the antenna mounting bracket of FIG. 3 with one antenna mounting member omitted.
Figure 6:
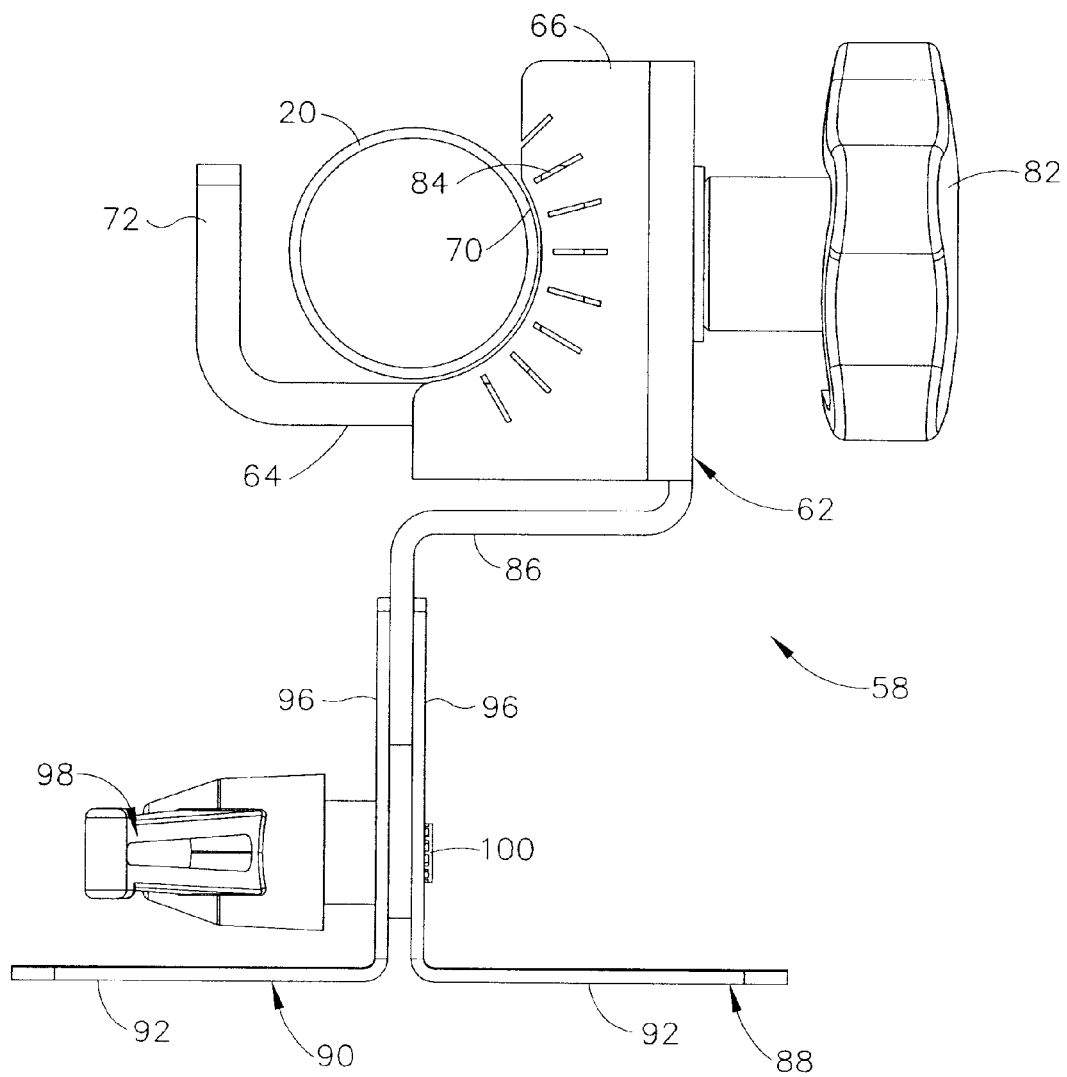
FIG. 6 is a side view along the longitudinal axis of the mounting pole of the antenna mounting bracket of FIG. 3.

In FIGS. 4-6, the pole clamp 62 grips the mounting pole 20 by adjustably drawing in a U-shaped channel 64 that substantially encompasses the mounting pole 20 into a pole mounting bracket 66 so that engagement surfaces 68, 70 longitudinally spaced along one lateral side of the mounting pole 20 cooperate with an opposite flange 72 of the U-shaped channel 64. The engagement surfaces 68, 70 are recessed to correspond to a portion of the circumference of a mounting pole 20 to enhance the frictional engagement, although it should be appreciated that various contacting contours and finishes may be selected (e.g., roughed, toothed, flat, V-shaped). Similarly, although a flat opposite flange 72 is depicted, it should be appreciated that other contours and finishes may be selected to enhance the contact area and/or frictional contact with the mounting pole 20.

A channel post 74 attached to an inner flange 76 of the U-shaped channel 64 extends laterally within a channel receiving recess 78 formed within the pole mounting bracket 66 outward and extends out through a post hole 80. It should be appreciated that external threads on the channel post 74 engage internal threads in a hand-adjusted clamp knob 82 such that rotation in one direction (e.g., clockwise) draws the L-shaped channel 64 further into the channel receiving recess 78 in the pole mounting bracket 66, which also prevents rotation of the U-shaped channel and thus the channel post 74. Thereby, the lateral spacing between the engagement surface 68, 70 of the pole mounting bracket 66 and the opposite flange 72 of the U-shaped channel 64 is narrowed. Rotation in the opposite direction (e.g., counterclockwise) allows greater lateral spacing. With particular reference to FIG. 6, radial indicia 84 formed about the engagement surfaces 68, 70 on the pole capturing bracket 66 may assist in setting a desired radial angle relative to the longitudinal axis of the mounting pole 20, which may include corresponding markings.

A pivoting flange 86 is attached to the pole mounting bracket 66 and aligned generally with the longitudinal axis of the U-shaped channel 64. Mirror image first and second antenna mounting members 88, 90 each have outward planar portions 92 that are placed adjacent and aligned in a plane for mounting of an RFID antenna (not shown) through fastener holes 94. Each antenna mounting member 88, 90 has an isosceles triangular flange 96 formed at a perpendicular angle from an inner edge of the respective outward planar portion 92. A locking lever 98 that rotates in a plane parallel to isosceles triangular flanges 96 tightens a locking bolt 100 that passes through holes formed through the triangular flanges 94 and the pivoting flange 84, allowing the pivoting flange to be set at a desired azimuth angle relative to the longitudinal axis defined by the mounting pole 20. With particular reference to FIG. 4, radial indicia 102 formed on the pivoting flange 86 may be referenced to an apex marking 104 on the isosceles triangular flanges 96 to determine a set azimuth angle. A locking hole 106 is provided through the isosceles triangular flanges 88, 90 through which a locking bolt or similar fastener may be inserted to provide additional locking force.

Figure 7:
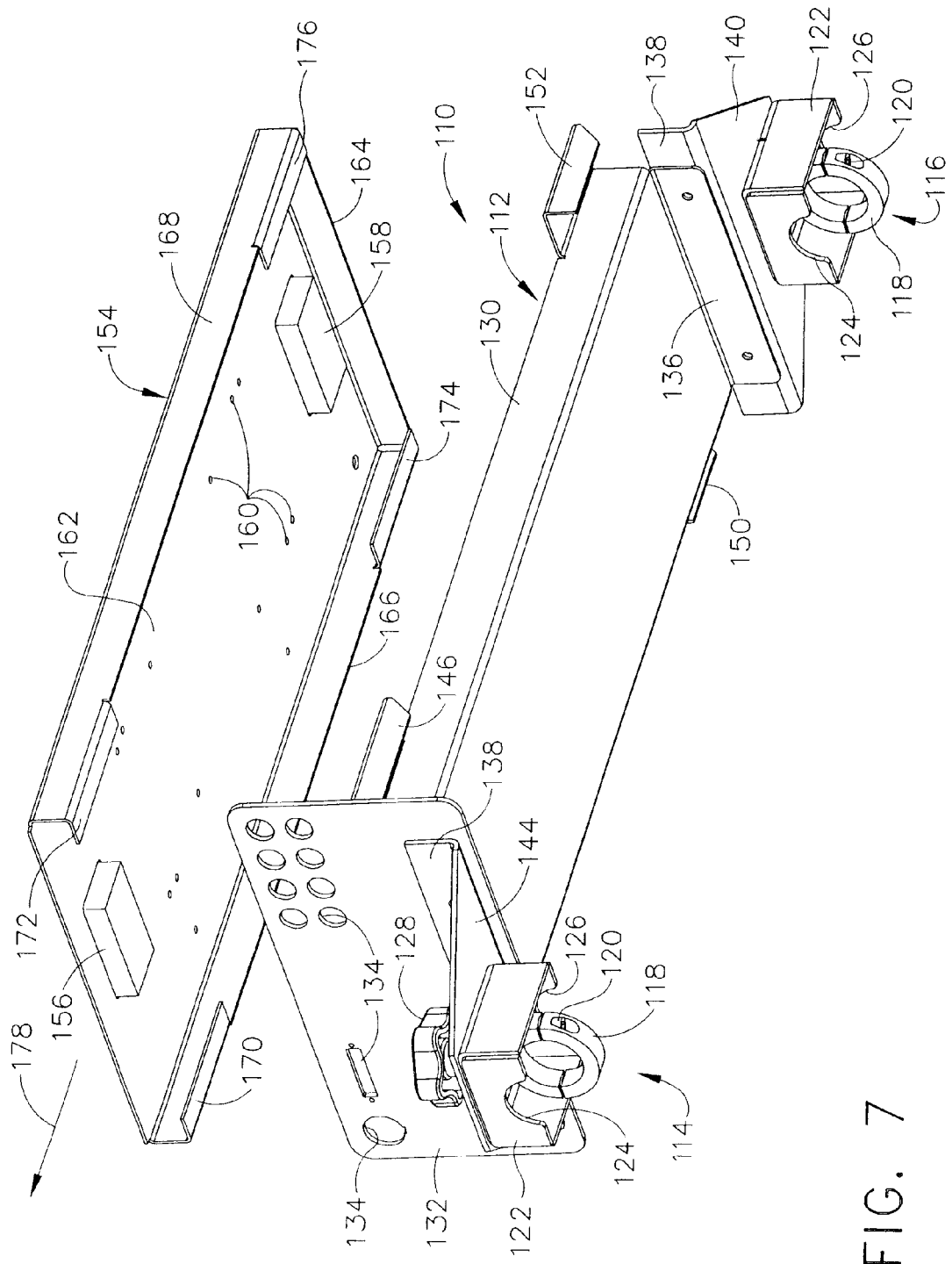
FIG. 7 is an isometric, exploded view of an RFID reader sled assembly for the RFID reader station of FIG. 1.

To provide additional mounting capabilities in addition to positioning RFID antennas 60, in FIG. 7 a reader sled assembly 110 includes a reader sled base 112 with longitudinally spaced first and second attachment brackets 114, 116 (similar in design to the pole clamp 62 of FIGS. 4-6) on each end for attachment to the mounting pole 20. In this instance, a two-piece circular ring 118 of each bracket 114, 116 is fastened around the mounting pole 20 by recessed fasteners 120. The two-piece ring is drawn into a pole engaging structure shaped as a half rectangular box 122 with semi-circular pole engaging recessed surfaces 124, 126 by a hand-tightened knob 128.

The reader sled base 112 includes a shallow rectangular channel 130 closed on a first end by a large rectangular plate (bulkhead) 132 with mounting apertures 134 for electronic interconnects suitable for one or more available RFID readers (not shown). A second end of the shallow rectangular channel 130 turns downward into a mounting flange 136 that is fastened to an upturned mounting flange 138 of a horizontal triangular attachment surface 140 that overlies the pole engaging structure 122 and through which the knob 128 operates. On the first end of the shallow rectangular channel 130, a horizontal triangular attachment surface 144, which is identical to the horizontal triangular attachment surface 140, but horizontally rotated a half turn, is attached to the large rectangular plate 132 for supporting the first attachment bracket 114. Near the first end of the shallow rectangular channel 130 along a top surface, first left and right guides 146 (when viewed from the first end, left one hidden) extend first outwardly and then down. Near the second end of the shallow rectangular channel 130 along a top surface, second left and right guides 150, 152 extend first outwardly and then down.

Facilitating repair and installation, a reader plate 154 may be detached from the reader sled base 112 for mounting to the RFID reader (not shown). Top accessed finger grip receptacles 156, 158 near the first and second ends, respectively, assist in disassembly, carrying, and assembly. Between the grip receptacles 156, 158, a plurality of mounting holes 160 are predrilled into a horizontal portion 162 of the reader plate 154 to accommodate the fastener mounting patterns for available RFID readers.

The reader plate 154 is shaped like a shoe box lid with an open first end. In particular, the second end is closed by a downwardly extending flange 164 from the second end of the horizontal portion 162. Left and right flanges 166, 168 extend downwardly respectively from lateral edges of the horizontal portion 162. Near the first ends of bottom surfaces of the left and right flanges 166, 168, first left and right inward tabs 170, 172 respectively extend horizontally for engagement beneath respectively the first left and right guides 146 of the reader sled base 112. Near the second ends of bottom surfaces of the left and right flanges 166, 168, second left and right inward tabs 174, 176 respectively extend horizontally for engagement beneath respectively the second left and right guides 150, 152 of the reader sled base 112. Thus, assembly of the reader plate 154 to the reader sled base 112 to form the reader sled assembly 110 includes placing the reader plate 154 on top of the reader sled base 112 with the reader plate 154 displaced away from the bulkhead 132 such that the first inward tabs 170, 172 and second inward tabs 174, 176 are offset respectively from the first left and right guides 146 and second left and right guides 150, 152. Movement of the reader plate 154 toward the bulkhead 132 in the direction of an assembly arrow depicted at 178 causes the engagement between the reader plate 154 and reader sled base 112.

Figure 8:
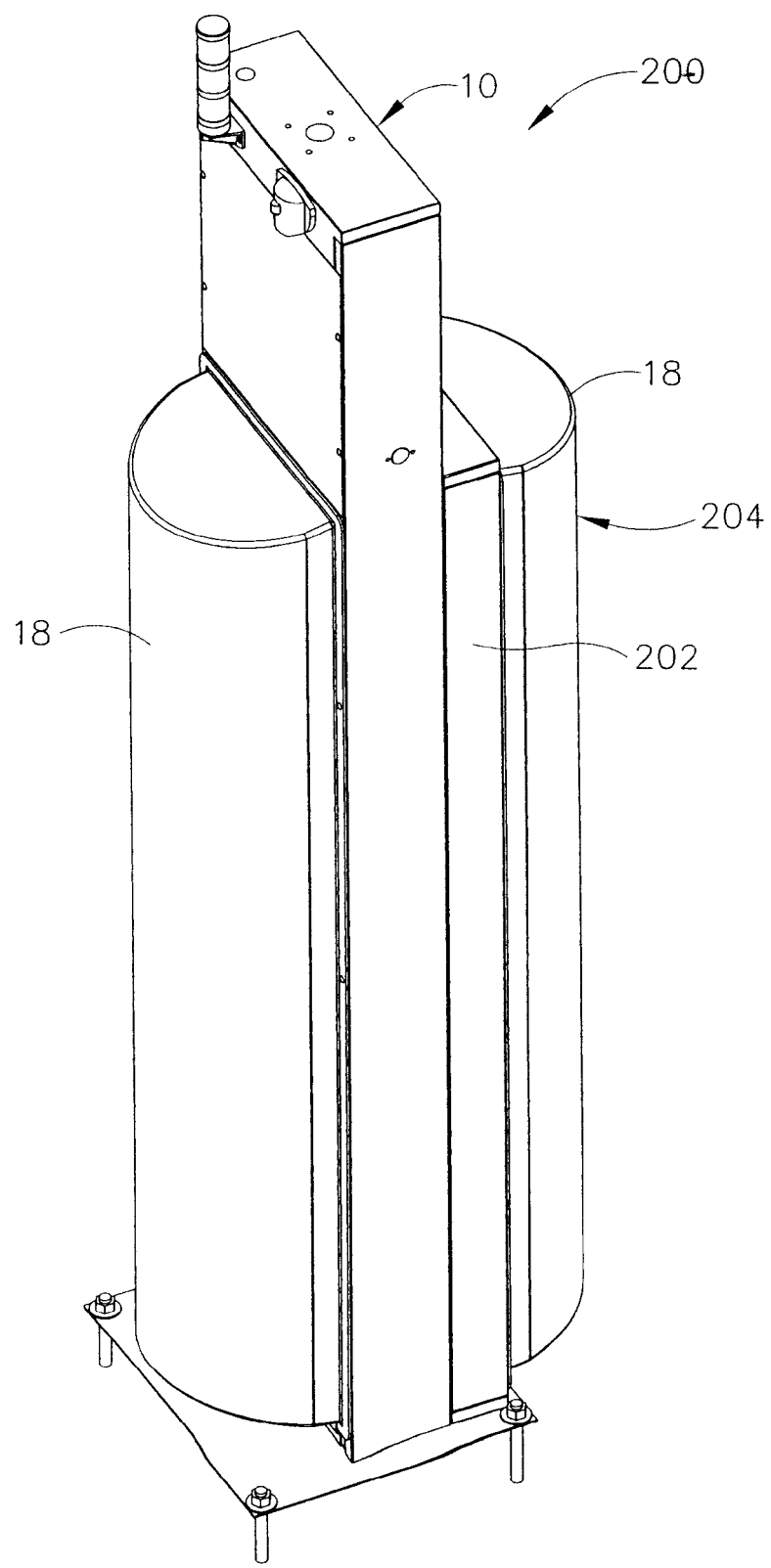
FIG. 8 is an isometric view of a dual-sided RFID reader station that includes the RFID reader station of FIG. 1.

In FIG. 8, to gain additional coverage in azimuth, a dual-sided RFID reader station 200 includes the features of the RFID reader station 10 of FIG. 1 but additionally mounts a rectangular pole and radome frame 202 onto a backside of the pedestal cabinet 12, supporting a second longitudinally bisected elongate half-cylindrical radome 18. It should be appreciated that another set of RFID antennas 60 and antenna mounting brackets 18 supported within the frame 202 and second radome 202 form a remote RFID reader station 204 monitored by the control circuitry (not shown) of the attached RFID reader station 10, providing coverage to both sides of the station 200, such as when placed between two doorways, as may be common when a circular trafficflow pattern in a warehouse is used to minimize collisions.

Figure 9:
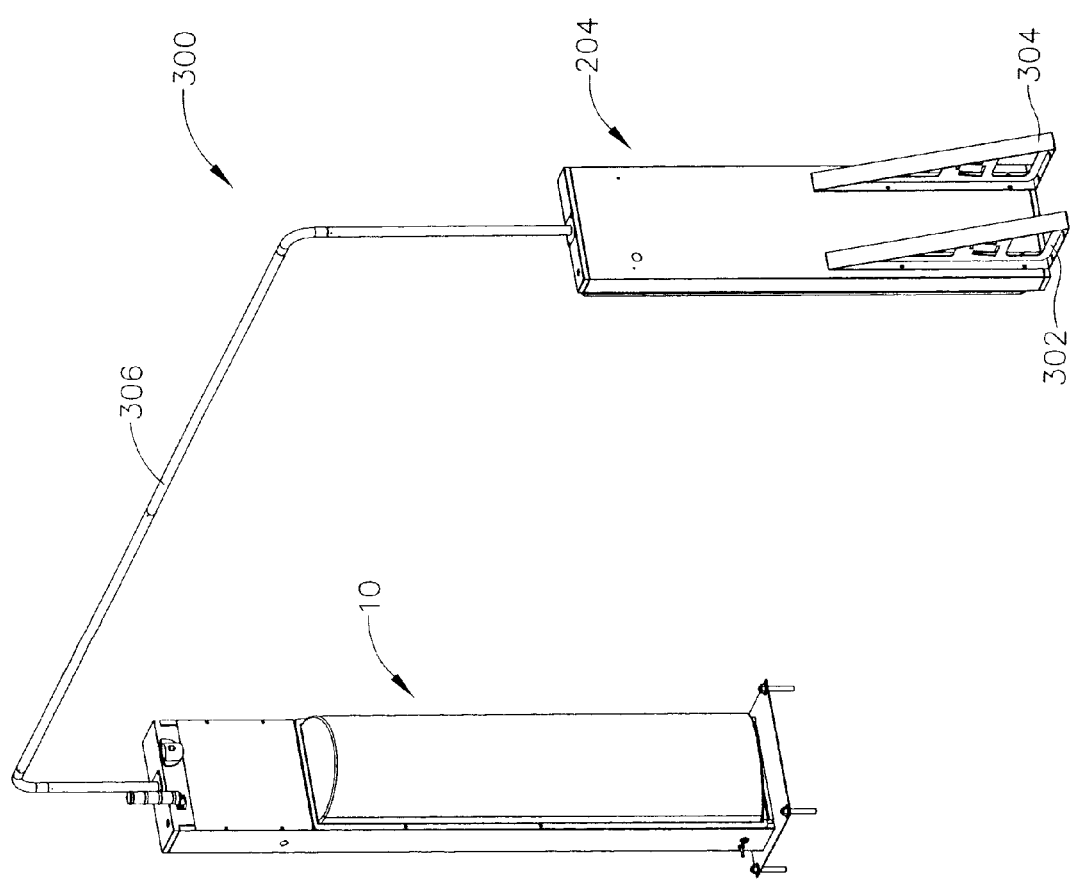
FIG. 9 is an interconnected RFID reader station that inwardly orients and laterally spaces the RFID reader station and a remote RFID reader station of FIG. 8.

In FIG. 9, to gain additional range across a wide traffic way (e.g., large doorway), an interconnected RFID reader station 300 is similar to that described above in FIG. 8, but with the remote RFID reader station 204 displaced from the primary RFID reader station 10 such that the radomes 18 of each are aimed toward each other to form a wider interrogation zone. The remote RFID reader station 300 is supported by a pair of right angle bracket supports 302, 304 that prevent falling backward. The remote RFID reader station 300 is also supported from falling forward by conduit 306 that extends upwardly from the remote RFID station 300, then horizontally over the interrogation zone, and then downwardly into the primary RFID reader station 10. The conduit 306 also serves as a communication conduit between the stations 10, 300 so that one RFID reader may operate both.

Figure 10:
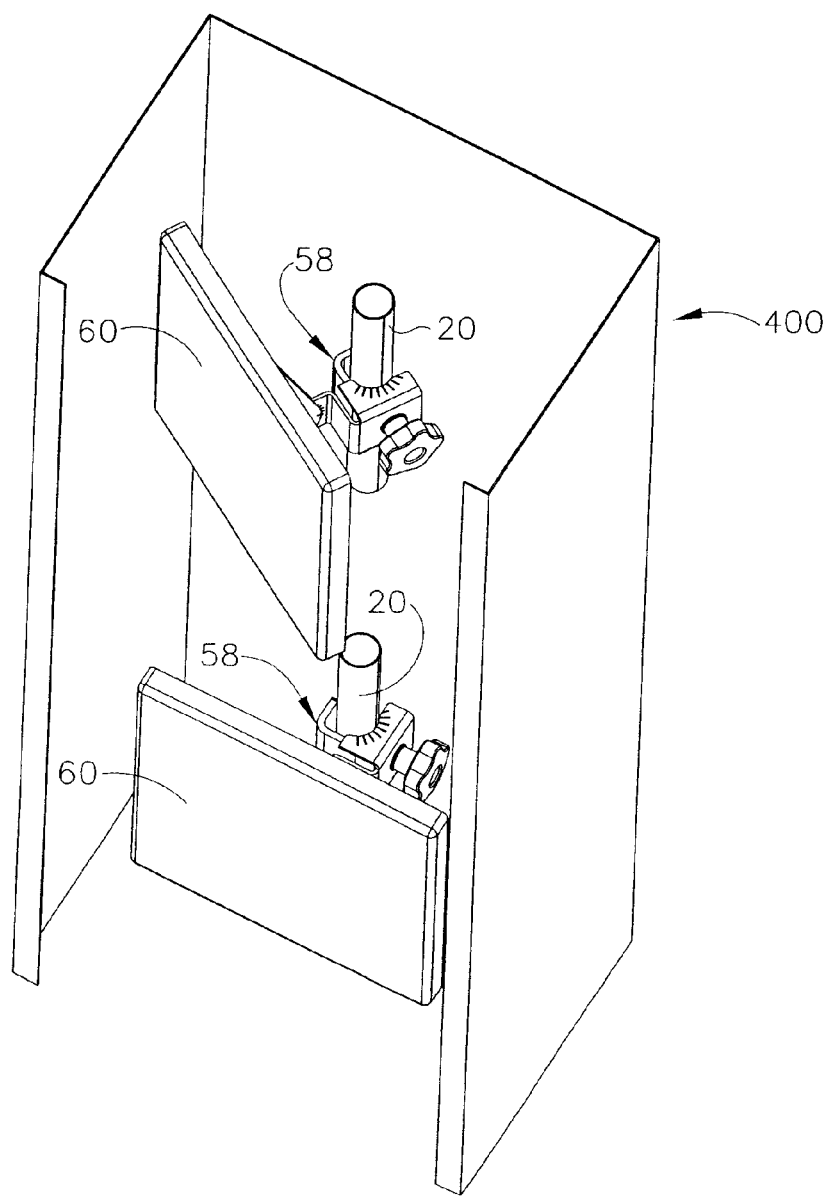
FIG. 10 is a detail view of a deepened channel for encompassing on three sides antenna mounting brackets.

In FIG. 10, in some applications, an interrogation zone may advantageously be a relatively narrow field to avoid inadvertent detections. It may be advantageous to provide additional protection to the radome and/or antennas from side impacts. A deeper vertical channel 400 thus fully encompasses the antennas 60, mounting pole 20, and antenna mounting bracket 58 from behind and laterally and also allows use of a flat RF transmissive cover (not shown).

Figure 11:
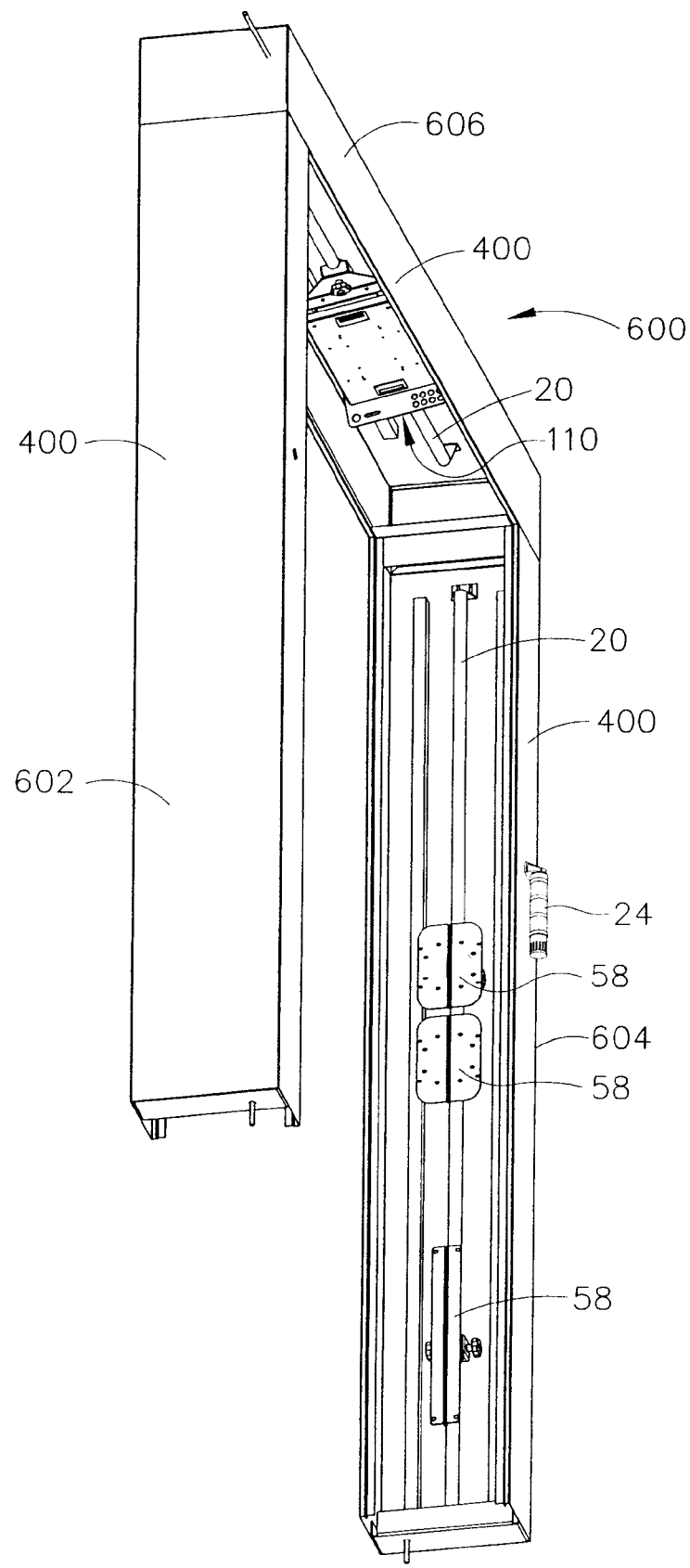
FIG. 11 is an isometric view of a portal RFID reader station with flat RF transmissive covers omitted and incorporating the deepened channel of FIG. 10.
Figure 12:
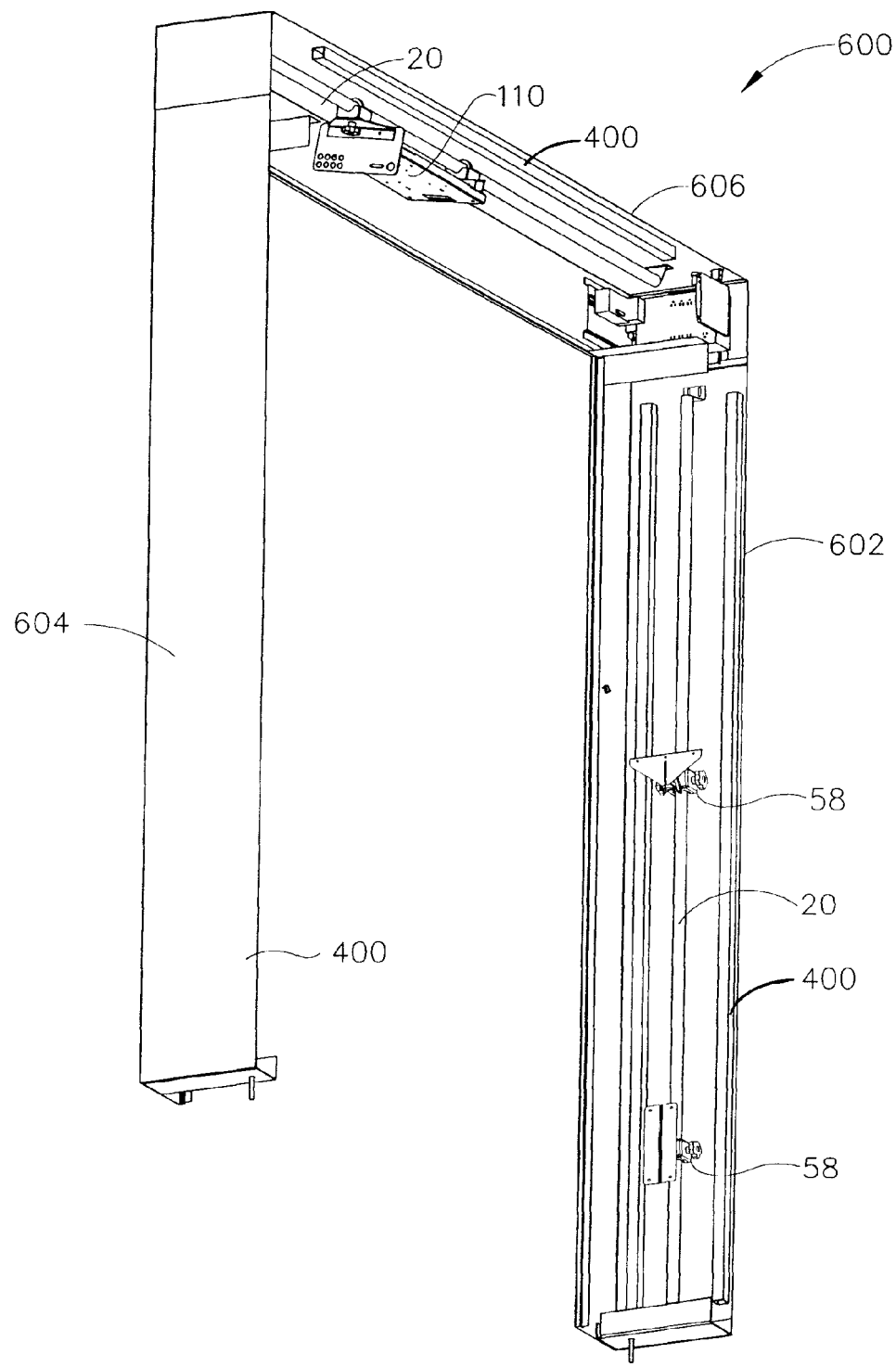
FIG. 12 is an isometric view of the portal RFID reader station of FIG. 11.
Figure 13:
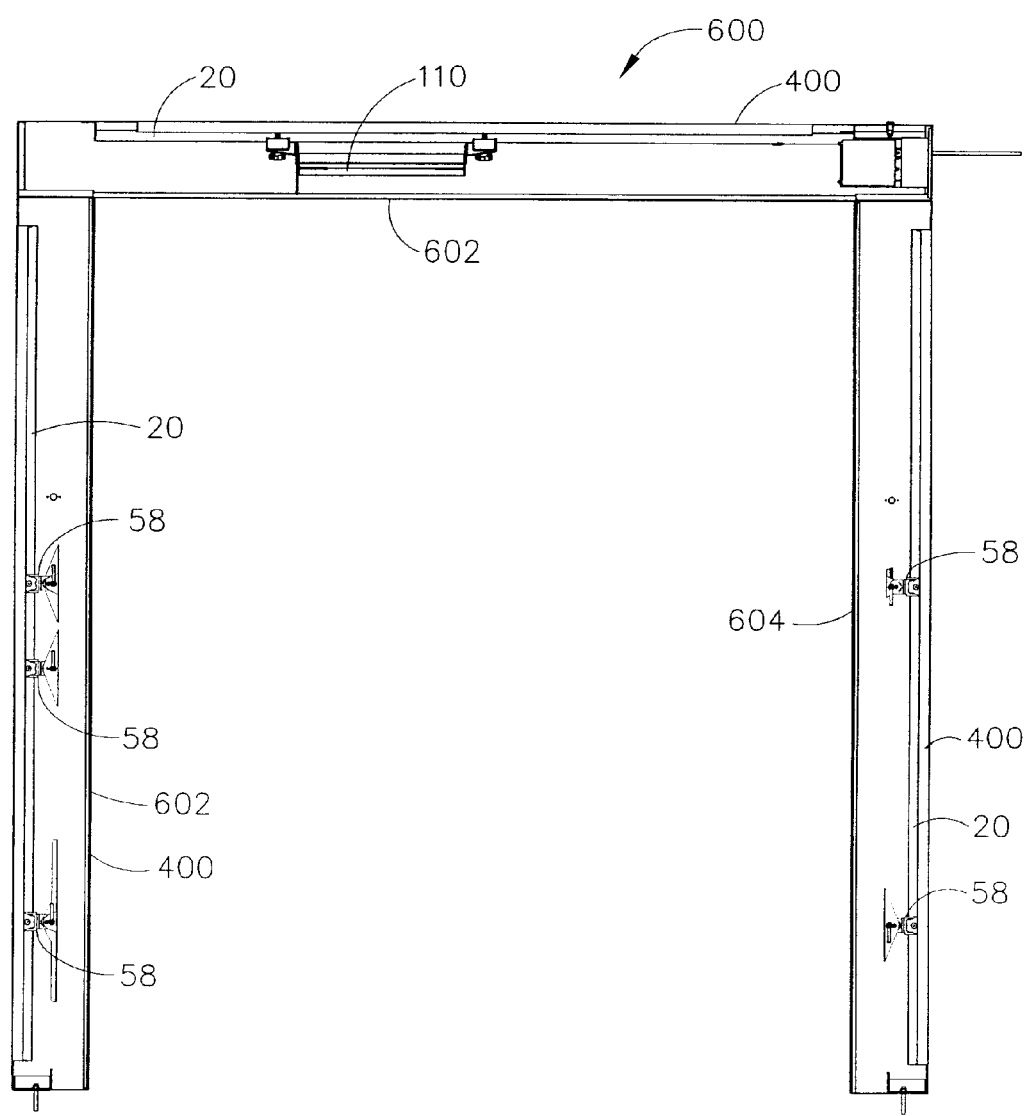
FIG. 13 is a side view of the portal RFID reader station of FIG. 11 with a front portion of left, right and overhead cabinets omitted.

In FIGS. 11-13, a portal RFID reader station 600 comprises left and right antenna cabinets 602, 604 that include a deeper vertical channel 400 opening inwardly toward the interrogation zone therebetween and closed by flat RF transmissive covers (not shown). Each cabinet 602, 604 includes a vertical mounting pole 20 for mounting a plurality of antenna mounting brackets 58. An overhead cabinet 606 opening downwardly into the interrogation zone and also formed from a deeper vertical channel 400 connects the left and right antenna cabinets 602, 604. The overhead cabinet 606 includes a horizontal mounting pole 20 for attaching antenna mounting brackets 58 as well as an RFID reader sled assembly 110.

It should be appreciated that applications consistent with the present application may include radomes instead of flat RF transmissive covers for any of the cabinets 602, 604, 606 of a portal RFID reader station.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

For example, while mounting poles and RFID antennas and readers are protected within cabinet and radome structures in the exemplary versions, applications consistent with aspects of the inventions may expose portions or such equipment and structure for purposes such as enhanced access and/or increased antenna gain, especially in applications not subject to inadvertent impact or inclement environmental conditions.

As another example, while a round mounting pole is depicted in exemplary versions affording continuous adjustment in radial angle and longitudinal position, applications consistent with aspects of the invention may include poles of cross section shapes other than round, such as including indents or protuberances that engage with corresponding features in the clamp to register at discrete angular and/or longitudinal positions.

As an additional example, while a mounting bracket that does not require tools for installation has advantages, applications consistent with aspects of the invention may utilize mountings requiring hand tools or preassembled and permanently fixed mountings.

What is claimed is:

1. A radio frequency identification (RFID) apparatus for mounting RFID antennas and an RFID reader near a traffic way traversed by cargo bearing an RFID tag, the apparatus comprising:
   an elongate enclosure comprising a vertical portion having at least two sides;
   a post supported by the vertical portion of the elongate enclosure, wherein the post is positioned within the elongate enclosure along a length of the elongate enclosure, wherein the at least two sides of the elongate enclosure are positioned so as to define an area enclosing at least a portion of the post;
   a post mounting clamp attachable selectively along the length of the post, the elongate enclosure being sized for selecting a radial adjustment of the post mounting clamp; and
   an RFID equipment mounting surface in communication with the post mounting clamp, wherein at least a portion of the RFID equipment mounting surface is configured to move pivotally in relation to at least a portion of the post mounting clamp, wherein the post mounting clamp is configured for radial adjustment in relation to the post.

2. The RFID apparatus of claim 1, wherein the RFID equipment mounting surface is sized to receive an RFID antenna.

3. The RFID apparatus of claim 2, further comprising an articulation clamp attached for pivoting movement between the post mounting clamp and the RFID equipment mounting surface to adjustably angle the RFID mounting surface at a nonparallel alignment to the post.

4. The RFID apparatus of claim 1, further comprising a second post mounting clamp attached to an opposite longitudinal end of the RFID mounting surface, wherein the RFID mounting surface is sized to support the RFID reader.

5. The RFID apparatus of claim 4, further comprising an RFID reader tray operably configured to be fastened to the RFID reader and to slidably engage to the RFID mounting surface.

6. The apparatus of claim 1, further comprising a left vertical portion, a right vertical portion and a connecting top horizontal portion, each portion comprising an elongate enclosure containing a lengthwise attached post positioned to selectively receive the post mounting clamp.

7. The RFID apparatus of claim 1, further comprising a second post mounting clamp, wherein the second post mounting clamp is configured to be mounted on the post at a position substantially vertically in line with the post mounting clamp.

8. The RFID apparatus of claim 7, wherein the second post mounting clamp is configured for articulation independent of the post mounting clamp.

9. The RFID apparatus of claim 1, wherein the RFID equipment mounting surface is in communication with the post mounting clamp through a single articulating member.

10. The RFID apparatus of claim 9, wherein the single articulating member is a hinge.

* * * * *